United States Patent

Habijanec et al.

[11] Patent Number: 5,727,730
[45] Date of Patent: Mar. 17, 1998

[54] AIR HEATING DEVICE

[75] Inventors: Stephan Habijanec, Krailling; Christine Sallinger, Unterschleissheim; Rüdiger Galtz, Gräfelfing, all of Germany

[73] Assignee: Webasto Thermosysteme GmbH, Stockdorf, Germany

[21] Appl. No.: 525,510

[22] PCT Filed: Mar. 24, 1994

[86] PCT No.: PCT/EP94/00943

§ 371 Date: Nov. 1, 1995

§ 102(e) Date: Nov. 1, 1995

[87] PCT Pub. No.: WO94/21972

PCT Pub. Date: Sep. 29, 1994

[30] Foreign Application Priority Data

Mar. 25, 1993 [DE] Germany ............ 93 04 540 U

[51] Int. Cl.⁶ ............................................. F24H 7/04
[52] U.S. Cl. .................. 237/12.3 C; 237/49; 126/110 A; 126/110 B
[58] Field of Search ............... 237/46, 48, 49, 237/53, 54, 12.3 C; 126/533, 110 A, 110 B, 112

[56] References Cited

U.S. PATENT DOCUMENTS

| 2,732,133 | 1/1956 | Lintern | 237/49 |
| 3,358,675 | 12/1967 | Voges | 126/110 |
| 4,646,966 | 3/1987 | Nussbaum | 237/49 |
| 4,784,110 | 11/1988 | Skafte et al. | 126/110 |

*Primary Examiner*—William Doerrler
*Attorney, Agent, or Firm*—Sixbey, Friedman Leedom & Ferguson; David S. Safran

[57] ABSTRACT

The invention relates to an air heating device with a hot air fan located in a housing to deliver hot air from an air inlet opening which is located on the face side via a heat exchanger to a hot air exit opening located on the opposite face.

The object of the invention is to devise an air heating device which can always intake a sufficient amount of hot air regardless of its installation position without additional parts.

This object is achieved by the fact that the housing near the face air inlet opening on its outside periphery on at least one side has additional air inlet openings.

9 Claims, 2 Drawing Sheets

AIR HEATING DEVICE

The invention relates to an air heating device with a hot air fan located in a housing to deliver hot air from an air inlet opening which is located on the face side via a heat exchanger to a hot air exit opening located on the opposite face.

An air heating device of this type is known from DE-U 77 02 288. In this heating device the disadvantage is that the face with the air inlet opening when installed in a vehicle, for example, in the passenger compartment of the latter, must always have a sufficient interval from an adjacent part in order that enough hot air can be delivered. As space becomes increasingly cramped in modern vehicles this can lead to the fact that a heating device of this type either cannot be installed at all or only with expensive deflection adapters which are attached on the face end of the heating device on the side of the air inlet opening.

The object of the invention is to devise an air heating device which can always intake a sufficient amount of hot air regardless of its installation position without additional parts.

This object is achieved by the fact that the housing near the face air inlet opening on its outside periphery on at least one side has additional air inlet openings. If an air heating device according to the invention is installed with its air inlet-side face directly on a wall in the vehicle, sufficiently large admission cross sections for the hot air are made available by the peripheral-side air inlet openings.

A housing with a roughly rectangular cross section with additional air inlet openings on its top and at least one side wall is advantageous. One embodiment is especially preferred in which the two side walls have additional air inlet openings. An air heating device formed in this way in the extreme case can rest simultaneously on walls or parts of the vehicle with its air inlet-side face and with two adjacent outside walls of the housing and a relatively large inlet cross section is made available by at least one air inlet opening on another open housing wall.

Advantageously the air inlet openings are formed by several parallel slots. It is advantageous for their stability if the wall parts of the housing which lie outside and between the slots are joined to cross pieces located transversely thereto in the form of a grate structure.

The housing is made preferably of plastic in a molding tool, the air inlet openings being at least partially molded in during production in the same cycle.

In another advantageous embodiment the housing on the face and on several walls of its periphery has air inlet openings into which either admission grates which form separate parts or just such cover parts can be selectively inserted. In this way it can be established by the installation shop or the final customer through which of the air inlet openings air is in fact to be intaken. Thus, inserting a cover part for example can prevent suction of hot air for delivery to the vehicle interior from an adjacent part from which oil- or gasoline-containing vapors originate.

In the following one embodiment of the invention is described using the drawing.

Figure 1:
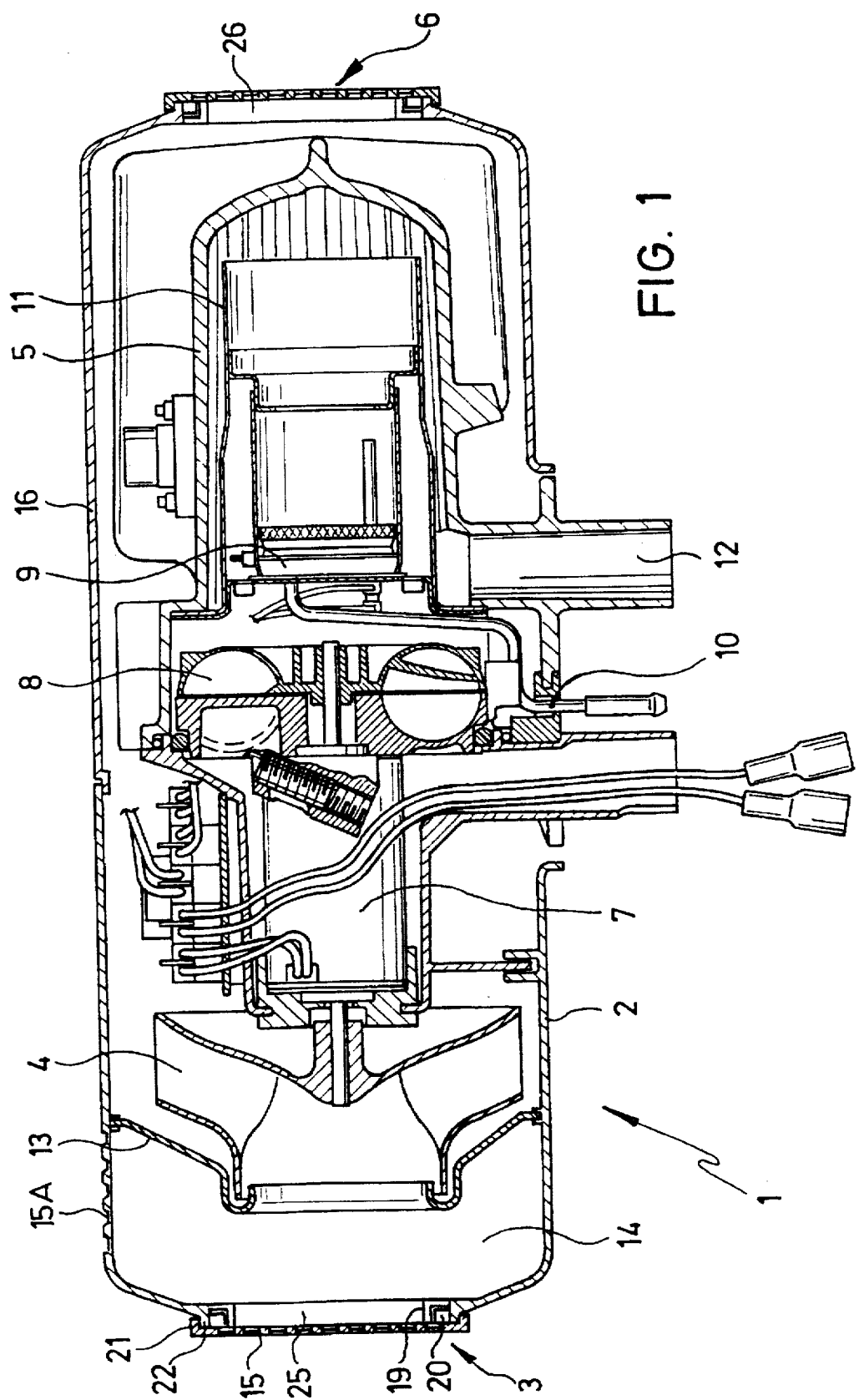
FIG. 1 shows a longitudinal section through an air heating device.

In FIG. 1, 1 labels an air heating device with housing 2 which has on one face 3 air inlet opening 25 through which by means of hot air fan 4 air is intaken, heated via heat exchanger 5 and delivered via air outlet opening 26 located on opposite face 6 of housing 2 to a vehicle interior to be heated. This air heating device 1 is used for example to heat the driver's compartment of a truck.

Hot air fan 4 formed as a semiaxial fan is driven by means of electric motor 7 which simultaneously drives combustion air fan 8 via a second shaft. The combustion air delivered by the fan is conventionally sent to a burner 9 and there with the fuel supplied via fuel line 10 forms a combustible mixture which burns in combustion chamber 11. Combustion chamber 11 is surrounded by heat exchanger 5. The combustion gases are deflected after leaving combustion chamber 11 on the one hand on the face on heat exchanger 5, heat its walls preferably provided with ribs, and then leave heating device 1 via exhaust gas connection 12.

Figure 2:
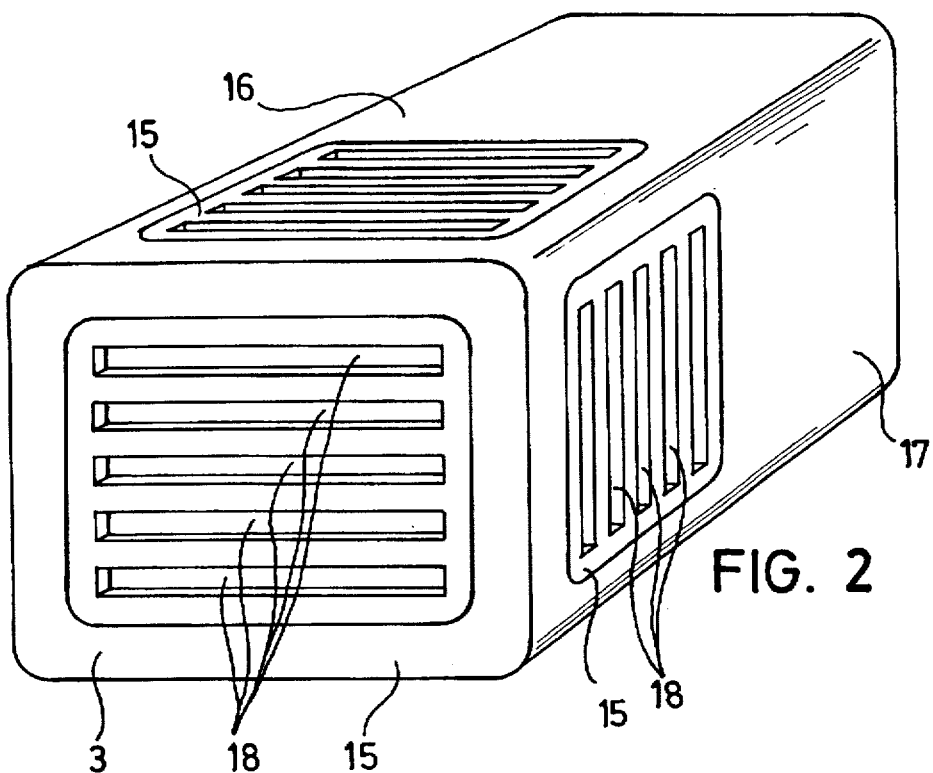
FIG. 2 shows a perspective view of a housing.

On the intake side of hot air fan 4, within housing 2 is annular screen 13. Screen 13 with face 3 and the surrounding side walls of housing 2 delineates air inlet chamber 14 into which according to the invention, besides face-side air inlet opening 25, other air inlet openings located in the side walls of housing 2 discharge. These air inlet openings are covered by admission grates 15, 15A which can be made either as separate parts 15 or in one version also as admission grates 15A (FIG. 1) molded directly on housing 2. As shown in FIG. 2, housing 2 on its face 3, on its top 16, and on two side walls 17 has one admission grate 15 each. This ensures that air heating device 1 remains serviceable even under unfavorable installation conditions in which for example face 3 and one of side walls 17 must be located in a vehicle interior or an engine compartment directly on a solid wall. Slots 18 provided in admission grates 15, 15A are dimensioned such that single admission grate 15, 15A makes available a sufficient admission cross section for the hot air.

In a version which is not shown admission grates 15, 15A can also be partially replaced by cover parts which are not shown. By selective use of admission grates 15, 15A and cover parts it can be established later depending on the installation situation in a uniformly shaped housing 2, from which side or sides the air is to be intaken.

Figures 3, 4:
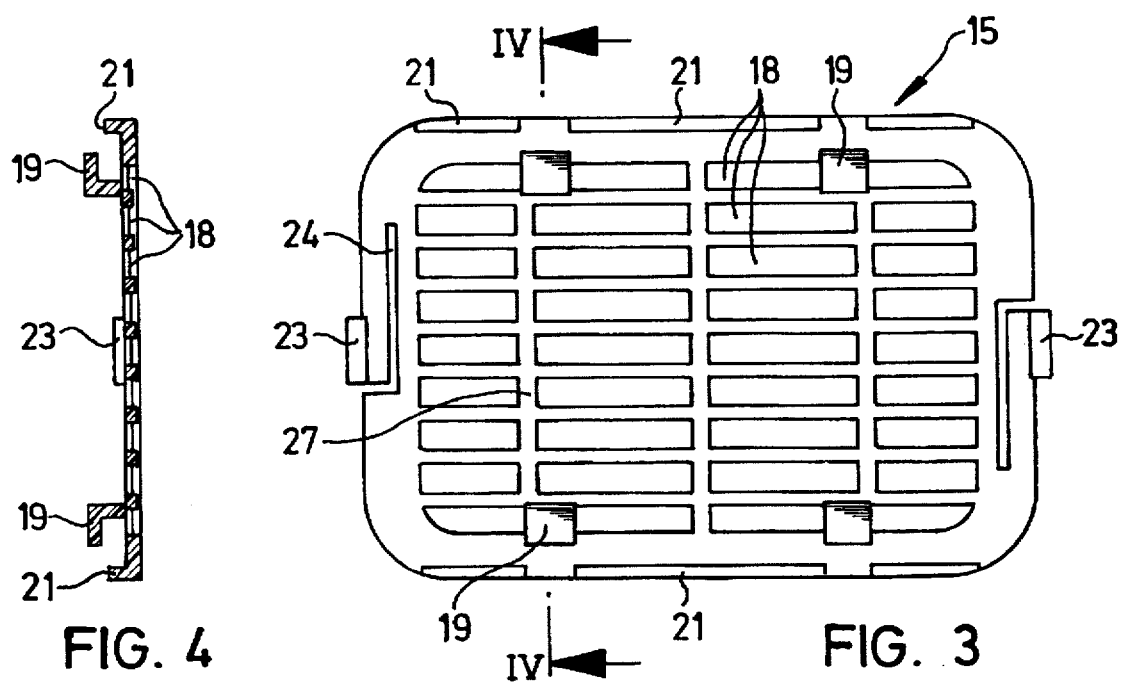
FIG. 3 shows a detailed representation of an admission grate.
FIG. 4 shows a section through the admission grate of FIG. 3 along line IV—IV.

FIGS. 3 and 4 show in detail admission grate 15 which can be inserted into air inlet opening 25 of housing 2. Slots 18 are interrupted by crosspieces 27 which run transversely thereto so that in conjunction with the wall parts which lie between slots 18 a stable grate structure is formed. Near its upper or lower edge admission grate 15 has projections 21 which, as shown in FIG. 1, are used to encompass projecting edges 22 of air inlet opening 25. Admission grate 15 on the same side on which projections 21 are located has catch hooks 19 which are made L-shaped and when inserted into air inlet opening 25 fit behind catch projections 20 located securely there (FIG. 1). For insertion of admission grate 15 catch hooks 19 are positioned first directly laterally next to catch projections 20, at the same time projections 21 encompassing projecting edges 22 at the top and bottom. Then, by slightly shifting admission grate 15 to the side catch projections 20 reach behind catch hooks 19 (FIG. 1). Slight lateral shifting of admission grate 15 is enabled by the fact that on it on both sides there are spring tongues 23 which are formed advantageously, as described, directly by slits 24 in the material of admission grate 15. Spring tongues 23 after insertion of admission grate 15 rest on the side edges of air inlet opening 25 and captively hold admission grate 15 therein.

Depending on the number or shape of the air inlet openings the heart of this invention lies in providing at least another air inlet opening on the periphery of an air heating device in addition to a face air inlet opening.

We claim:

1. Air heating device for a motor vehicle with a hot air fan located in a housing to deliver hot air from an air inlet opening which is located on an end of the housing via a heat exchanger to a hot air exit opening located on an opposite end of the housing; wherein the housing has, on its periphery near said air inlet opening, additional air inlet openings; and wherein the air inlet opening on the end of the housing and the additional air inlet openings on the periphery of the housing all communicate with a common inlet chamber on a suction side of the hot air fan.

2. Air heating device according to claim 1, wherein the housing has a roughly rectangular cross section and said additional air inlet openings are provided on its top and at least one side wall.

3. Air heating device according to claim 2, wherein said additional air inlet openings are provided on both side walls.

4. Air heating device according to claim 1, wherein said air inlet openings are each formed by several parallel slots.

5. Air heating device according to claim 4, wherein wall parts of the housing which are located outside and between said slots are joined to crosspieces which are located transversely thereto.

6. Air heating device according to claim 1, wherein the housing is made of molded plastic and the air inlet openings are at least partially molded in during production of the housing.

7. Air heating device according to claim 1, wherein an admission grate which forms a separate component from said housing is inserted into at least one of the air inlet openings.

8. Air heating device according to claim 6, wherein a cover part which forms a separate component from said housing is insertable into at least one of the air inlet openings.

9. Air heating device according to claim 8, wherein admission grate and the cover part are interchangeably insertable into receiver openings on the housing by means of clip connections.

* * * * *